United States Patent Office 3,536,759
Patented Oct. 27, 1970

3,536,759
TETRACYCLINE SULFAMATE AND DERIVATIVES THEREOF
Alberto Jurado and José Ma Puigmartí, Barcelona, Spain, assignors to Laboratorios Hosbon, S.A., Barcelona, Spain
No Drawing. Filed June 5, 1968, Ser. No. 734,573
Claims priority, application France, June 6, 1967, 109,212
Int. Cl. C07c *103/19*
U.S. Cl. 260—559  6 Claims

ABSTRACT OF THE DISCLOSURE

Compounds of the formula:

$$T \cdot (R-NHSO_3H)_n$$

wherein T is tetracycline or an administratable therapeutically active derivative thereof, R is a linear alkyl group of 2 to 18 carbon atoms and $n$ is 1 or 2. Therapeutic compositions comprising these compounds and a pharmaceutically acceptable carrier have an excellent local tolerance for all modies of administration, including oral, parenteral, rectal and topical. Beneficial results are illustrated with tetracycline n-dodecylsulfamate and tetracycline n-hexylsulfamate. The compounds are prepared by reacting an n-alkylsulfamic acid with a tetracycline in a slightly warm alcoholic solution.

---

The present invention relates to new tetracycline derivatives. More particularly, it relates to antibiotic medicameters or drugs having an excellent local tolerance for all methods of administration. Even more particularly, the invention relates to tetracycline sulfamate derivatives and to pharmaceutical compositions made therefrom.

The tetracyclines constitute essentially the most widely used group of antibiotics for therapeutic purposes. Their wide antimicrobial spectrum permits their use for the efficacious treatment of a considerable series of infectious diseases.

These products are easily absorbed upon oral administration, however, their systematic use by this mode of administration can cause considerable inconveniences, among which are the manifestation of intestinal superinfections, avitaminosis K and frequent gastrointestinal intolerances such as vomiting and diarrhea.

The use of related derivatives is therefore of considerable interest. However, compositions prepared from tetracycline derivatives are often poorly tolerated upon intramuscular administration, their absorption being less complete and inconsistent. Hypodermic administration and intravenous administration are hence less favorable with such compositions.

Accordingly, one of the objects of the present invention is to provide a new series of tetracycline derivatives which avoid the disadvantages of the prior art tetracyclines.

Another object of the present invention is to provide a process for the preparation of tetracycline sulfamate derivatives which may be carried out in an effective and advantageous manner.

Still another object of the present invention is to provide pharmaceutical compositions comprising n-alkylsulfamates of tetracycline and derivatives thereof which have an excellent local tolerance for all modes of administration.

A further object of the invention is to provide pharmaceutical compositions comprising novel tetracycline derivatives having advantageous solubility properties, good stability and, as desired, an immediate and intense effect or a prolonged effect.

Yet another object of the present invention is the provision of the administration of thhe novel tetracycline derivatives described herein by various routes to achieve excellent therapeutic effects.

These and other objects and advantages of the present invention will become apparent to those skilled in the art from a consideration of the following specification and claims.

In accordance with the present invention, it has been found that tetracycline n-alkylsulfamates or derivatives thereof having the general formula $$T \cdot (R-NHSO_3)_n$$

wherein T is a tetracycline molecule or a therapeutically acceptable derivatives thereof containing the tetracycline nucleus and having an antibiotic activity, R is a linear alkyl radical having from 2 to 18 carbon atoms and $n$ is 1 to 2, are effective as excellent antibiotic drugs having a good local tolerance for all methods of administration.

The active constituents of the medicament of the present invention are characterized by a good solubility in organic solvents, particularly in alcohols and glycols. The solubility thereof in water varies according to the length of the alkyl chain and the particular tetracycline moiety present in the molecule, but for any given tetracycline compound the solubility in water of the alkyl sulfamate derivatives decreases as the number of carbon atoms in the alkyl group increases. Thus, a series of compounds may be provided which pass from a perfect solubility to one which is practically zero. This fact together with the good stability of the novel compounds of the present invention makes it possible to utilize the same advantageously in pharmaceutical compositions in accordance with the desired object of, for example, having either an immediate and intense effect or, on the contrary, in preparations where a prolonged effect is sought.

The novel tetracycline compounds of the present invention may be prepared by reacting an n-alkylsulfamic acid with the desired tetracycline molecular in an alcoholic slightly warm solution until the two reagents are completely dissolved. The desired product is formed thereby and may be isolated by conventional means, for example, by evaporating the solvent at reduced pressure or by precipitation by adding to the reaction medium a slightly polar solvent in which the tetracycline n-alkylsulfamate formed is insoluble.

The alcohol utilized as reaction medium is preferably 95% ethanol, or anhydrous ethanol, or isopropanol. The reaction is generally carried out at a temperature of about 30° to 60° C. The precipitation medium most often employed is ethyl ether, anhydrous isopropyl ether or petroleum ether. In certain instances, mixtures thereof may be employed.

In order to isolate the novel compounds from the alcoholic solution thereof, in addition to the methods indicated hereinabove, a preferred process in certain cases is to "nebulize," i.e., to pulverize the alcoholic liquid into fine particles, and then to evaporate the solvent by introducing the particles into a hot gaseous stream.

Another method of preparation, starting from the same n-alkylsulfamic acids and the corresponding tetracyclines, comprises preparing in situ an aqueous solution of an alkaline metal or ammonium n-alkylsulfamate containing from 2 to 18 carbon atoms by directly neutralizing the acids with the desired base and putting this solution into contact with an aqueous solution of the corresponding tetracycline in the form of a mineral acid salt which may equally be prepared, if necessary, prior to the neutralization reaction. The desired tetracycline alkylsulfamate is then isolated by filtration, washed and dried at reduced pressure, at moderate temperatures and in the presence of phosphoric anhydride.

The temperature which is required for the reaction is essentially determined in each case on the basis of the solubility of the n-alkylsulfamates in water since, the longer the alkyl chain, the less soluble the salt, and the higher will thus be the temperature necessary for causing it to pass into solution. Inview of, on the one hand, the risk of thermal decomposition of the tetracyclines and, on the other hand, the solubility in water—already mentioned hereinabove—of the tetracycline alkylsulfamate having a shorter alkyl chain, this modified embodiment is not advantageous when compounds located at the two ends of the series are being prepared.

The two reagents are utilized in practically stoichiometric quantities. The proportion is equimolecular in case the tetracycline employed is monobasic, such as with tetracycline itself, chlortetracycline, oxytetracycline, methylene-oxytetracycline or demethylchlortetracycline. Two moles of alkaline metal or ammonium n-alkylsulfamate or of free acid (n-alkylsulfamic acid) are used per one mole of the corresponding tetracycline, present in the form of a mineral acid salt or in the form of a free base, in the case where the tetracycline derivative contains a supplementary basic group, such as, for example, in n-(2-hydroxyethyl)-diethylenediaminomethylenetetracycline, pyrrolidinomethylenetetracycline or tetracycline-L-methylenelsine.

The n-alkylsulfamic acids and the alkaline or ammonium salts thereof used as starting materials may be obtained by processes known in the art, detailed example of which are given hereinbelow.

The n-alkylsulfamates of tetracycline thus obtained generally have an excellent degree of purity but, if necessary, they may be subjected to a supplementary purification which consists normally in dissolving them in an alcoholic solvent or in acetone and in precipitating them by means of a slightly polar medium, such as ethyl ether or anhydrous isopropyl ether.

The following examples are given merely as illustrative of the preparation of the novel tetracycline derivatives of the present invention and are not to be considered as limiting. Unless otherwise noted, the percentages therein are by weight.

EXAMPLE 1

Added to a solution of 121.5 grams (1.2 moles) of n-hexylamine in 500 cc. of chloroform, dropwise and while stirring vigorously, is a solution of 46.7 grams (0.4 mole) of chlorosulfonic acid in 150 cc. of chloroform in a flask equipped with a refrigerant and protected against the ambient humidity. Stirring is continued for 15–30 minutes, and the solution is then extracted with 500 cc. of 2 N soda (sodium carbonate). Added to the aqueous layer, which is freed from residual chloroform by evaporation at reduced pressure, is sulfuric acid at 50% by weight per volume up to the complete precipitation. The crystals obtained are washed with water (2 or 3 times with 10–15 cc. each time), and the operation is concluded by drying in vacuo in an oven at 60° C.

Obtained are 36.8 grams (a theoretical yield of 50.7%) of n-hexylsulfamic acid in the form of crystals in chips. They are soft to the touch, not very soluble in cold water, soluble in hot water, soluble in aliphatic alcohols, moderately soluble in chloroform and very slightly soluble in ethyl ether. The melting point thereof is 140–143° C. (Kofler). The infrared spectrum (KBr pastille) gives the following representative bands: 2.32; 3.4; double band at 9.25 and 9.3; 12.95; 13.9; large intense band toward $8\mu$.

Upon titration with 0.1 N soda (sample dissolved in methanol) in the presence of phenolphthalein, a content of 100.3% is found.

18.13 grams (0.1 mole) of n-hexylsulfamic acid obtained as described above is dissolved in 200 cc. of absolute ethanol at 40–45° C. Added to the solution thus obtained is 44.44 grams (0.1 mole) of basic anhydrous tetracycline, or the equivalent amount of partially hydrated product, while vigorously stirring, up to the complete dissolution thereof. The stirring action and the temperature are maintained for 15–20 minutes. Then, the reaction mixture is allowed to cool to ambient temperature, and the reaction mixture is poured while stirring into 6–7 times its volume of ethyl ether. The precipitate formed is either filtered or decanted, washed by trituration with petroleum ether or hexane, filtered and dried for several hours at reduced pressure, preferably at a temperature of 40–45° C.

Obtained is 53.2 grams (a theoretical yield of 85%) of tetracycline n-hexysulfamate in the form of a light yellow powder. It is soluble in water, in aliphatic alcohols and in glycols and insoluble in ethyl ether, petroleum ether and hexane. The melting point thereof is 153–159° C. with decomposition (Kofler) (acetone:ether). The pH value of a 3% solution in distilled water is about 2.4. The infrared spectrum (KBr pastille with the incorporation of alcohol up to dryness) is as follows: principal maximums 3.05; 3.4; 6.4; 6.95; 8.2; 8.5; double band at 9.45 and $9.6\mu$.

*Elementary analysis.* — Found (percent): N=6.63; S=4.95.

*Analysis.*—calculated for $C_{28}H_{39}N_3O_{11}S$ (percent): N=6.71; S=5.12.

Bacteriological capacity (relative to the tetracycline hydrochloride.—Diffusion method: 758; 765 $\mu$g./mg. Theoretical capacity: 768.5 $\mu$g./mg.

EXAMPLE 2

33.5 grams of n-hexylsulfamic acid is added while stirring to 250 cc. of absolute ethyl alcohol, and the mixture is heated to 40–45° C. up to complete dissolution. 82.1 grams of anhydrous tetracycline base is then added while the stirring is continued, and the temperature is held up to the complete dissolution. The reaction is allowed to continue for another 30 minutes. The solution is freed from impurities by filtration. Then, evaporation is carried out at reduced pressure up to dryness. The product obtained is triturated and dried in an oven in vacuo at 50–60° C. for several hours.

Obtained is 114 grams (a theoretical yield of 98.5%) of tetracycline n-hexylsulfamate having the same characteristics as the product obtained in accordance with Example 1.

EXAMPLE 3

5.30 grams (0.02 mole) of n-dodecylsulfamic acid is dissolved in 100 cc. of 0.2 N soda at 50–60° C. The solution is subjected to an intense stirring while a solution of 9.62 grams of tetracycline hydrochloride in 150 cc. of water is added thereto dropwise. Stirring is effected for 20 minutes at 50–60° C. Thereafter the liquid of the precipitate formed is decanted and the latter is washed by returning it into suspension in 200 cc. of water. The reaction solution is then filtered and the obtained cake is washed twice with 50 cc. of water. It is then dried in an oven in vacuo at 60° C. in the presence of phosphoric anhydride.

Obtained is 12.6 grams (a theoretical yield of 89%) of tetracycline n-dodecylsulfamate in the form of a light yellow powder. It is practically tasteless, very slightly soluble in water, soluble in ethyl alcohol, isopropanol, propylene glycol, acetone and in hot chloroform, almost insoluble in ethyl ether and insoluble in petroleum ether and hexane. The melting point thereof is 133–140° C. (acetone:petroleum ether).

The infrared spectrum (KBr pastille with the incorporation of alcohol) gives the following principal maximums: 3.05; 3.42; 3.5; 6.22; 6.35; 6.9; 8.2; 8.4 and a double band at 9.67 and $9.76\mu$.

*Elementary analysis.*—Found (percent): N=5.82; S=4.45.

*Analysis.*—Calculated for $C_{34}H_{51}N_3O_{11}S$ (percent): N=5.94; S=4.51.

Bacteriological capacity (relative to the tetracycline hydrochloride). Diffusion method: 670 μg./mg. Theorectical capacity: 677 μg./mg.

EXAMPLE 4

Placed in suspension at 35–40° C. while stirring is 32.15 grams (0.1 mole) of n-hexadecylsulfamic acid in 300 cc. of absolute ethanol. Added to the mixture is 44.44 grams (0.1 mole) of anhydrous basic tetracycline or the equivalent of partially hydrated product until the two reagents are solubilized. Stirring is continued and the temperature is maintained for 20–30 minutes, and the solvent is then evaporated to dryness at reduced pressure. Trituration and drying in an oven at 50–60° C. in a vacuum less than 1 mm. [Hg] are then carried out.

Obtained is 74.3 grams (a theoretical yield of 97.0%) of tetracycline n-hexadecylsulfamate. It is a light yellow powder which is tasteless, insoluble in water, soluble in aliphatic alcohols, acetone and chloroform, slightly soluble in ethyl ether and insoluble in petroleum ether.

The melting point of the product is 132–136° C. (Kofler). The infrared spectrum (KBr pastille, drying with alcohol) presents the same band as those of the dodecylsulfamic homologue, but with different relative intensities.

*Elementary analysis.*—Found (percent): N=5.42; S=4.01.

*Analysis.*—Calculated for $C_{38}H_{59}N_3O_{11}S$ (percent): N=5.49; S=4.18.

Bacteriological capacity (relative to the tetracycline hydrochloride).—Diffusion method: 612 μg./mg. Theoretical capacity: 628 μg./mg.

EXAMPLE 5

In accordance with the process described in Example 4, 321.5 grams (0.1 mole) of n-hexadecylsulfamic acid is dissolved in 3,000 cc. of isopropanol. Added there is 444.4 grams (1 mole) of anhydrous base tetracycline so as to obtain a solution of tetracycline n-hexadecylsulfamate in isopropanol. The solution obtained is nebulized.

Obtained thereby is 705 grams (a theoretical yield of 92%) of tetracycline hexadecylsulfamate having the same characteristics as the product obtained according to Example 4, but with a lower apparatus density.

In accordance with analogous processes, the alkylsulfamates of other derivatives of tetracycline, such as, for example, oxytetracycline, chlortetracycline, methyleneoxytetracycline, demethylchlortetracycline, pyrrolidinomethylenetetracycline, N-(2-hydroxyethyl) - diethylenediaminomethylenetetracycline, and tetracycline-L-methylenelysine, may be obtained. For the three last-mentioned derivatives, the proportion of reactants used is 2 moles of alkylsulfonic reagent per mole of tetracycline compound.

Toxicological, pharmacological and clinical tests will now be indicated hereinbelow, exclusively by way of non-limitative examples, which were effected on two compounds forming the active constituent of the pharmaceutical preparations of the present invention. Specifically, tetracycline hexylsulfamate and tetracycline dodecylsulfamate were used in the tests since they are perfectly representatve of the compounds of the series.

(1) Toxicity (a) *Acute toxicity.*—The $LD_{50}$ determined for mice by the oral method is greater than 2 g./kg. for the two compounds tetracycline hexylsulfamate and tetracycline dodecylsulfamate. By the intraperitoneal method, it is approximately 310.2 mg./kg. for tetracycline dodecylsulfamate and about 380.6 mg./kg. for tetracycline hexylsulfamate; for tetracycline hydrochloride, according to the same technique, about 220.5 mg./kg. is found.

(b) *Subacute toxicity.*—The tests which were effected show a good general tolerance both for tetracycline dodecylsulfamate and tetracycline hexylsulfamate. The equivalent of 50 mg./kg. per day of these compounds was administered to 6 male rabbits for 30 days and was well tolerated (this being a dosage greater than the therapeutic dosage which is 10–25 mg./kg./day).

(2) Spectra of activity

These have been determined by the method of dilutions on a great variety of germs, and it has been found that there are no appreciable differences between the activity spectra of the two compounds of the present invention and other forms of tetracycline, the antibiotic properties thus being preserved.

(3) Tolerance and asbosption

Different tests effected with the two compounds show a good tolerance by rabbits for the intramuscular method.

In order to determine in a more precise fashion the local tolerance and the absorption, the following method was used:

(a) A solution is prepared containing 250 mg. of tetracycline activity in 4 cc. of solvent.

(b) 0.2 cc. per animal (white rat) is injected at the rate of 10 animals per experiment and per compound. The injection is carried out subcutaneously in the abdomen.

(c) Five animals of each group are sacrificed at the end of 5 hours, and the other five at the end of 20 hours after injection.

(d) The skin of the abdomen is dissected and a macroscopic study of the subcutaneous tissue is effectd by taking as reference the following notes:

Local tolerance—
    0=absence of lesion
    1=vascular injection
    2=hemorrhage
    3=necrosis Absorption—
    0=absence of deposit
    1=slight deposit
    2=moderate deposit
    3=significant deposit.

The following formulas were tested:

(1)
Tetracycline hydrochloride _____ mg__ 250
Distilled water _____ cm.³__ 4

(2)
Tetracycline hydrochloride _____ mg__ 250
Propylene glycol _____ cm.³__ 4

(3)
Pyrrolidinomethyltetracycline _____ mg__ 250
Distilled water _____ cm.³__ 4

(4)
Tetracycline dodecylsulfamate _____ mg__ 250
Propylene glycol _____ cm.³__ 4

(5)
Tetracycline hexylsulfamate _____ mg__ 250
Propylene glycol _____ cm.³__ 4

The weights are taken according to the respective equivalence in tetracycline activity.

The results obtained are compiled in Table I.

TABLE I

| Formula: | Tolerance | | Absorption (deposit) | |
|---|---|---|---|---|
|  | 5 hours | 20 hours | 5 hours | 20 hours |
| 1 | 1.6 | 1.8 | 2 | 1 |
| 2 | 1.8 | 1.8 | 2 | 1.5 |
| 3 | 2 | 2 | 1.5 | 0.5 |
| 4 | 0.3 | 0.5 | 2.7 | 1.6 |
| 5 | 0.5 | 1 | 2.5 | 1.5 |

The figures indicated in Table I represent the average of the results that have been obtained and show the superiority of tetracycline hexysulfamate and of tetracycline dodecylsulfamate, both with respect to the good tolerance and the absorption thereof.

(4) Hematic concentrations (a) Oral administration.—Administered to groups of 10 rats, each weighing about 150 grams, were doses (expressed in tetracycline activity) of 50 mg./kg. of tetracycline dodecylsulfamate, tetracycline hexysulfamate and tetracycline hydrochloride, respectively. One group was sacrificed for each product 1, 3, 5 and 7 hours, respectively, after the administration while the blood levels were determined. The results are indicated in Table II in the form of mean values expressed in $\mu g./cm.^3$.

TABLE II

| Product | Concentration, $\mu g./cm.^3$ at the end of— | | | |
|---|---|---|---|---|
| | 1 hour | 3 hours | 5 hours | 7 hours |
| Tetracycline dodecylsulfamate | 2.1 | 1.6 | 0.9 | 0.7 |
| Tetracycline hexylsulfamate | 2.4 | 1.8 | 1 | 0.7 |
| Tetracycline hydrochloride | 1.6 | 1.1 | 0.6 | |

Hence, the absorption of tetracycline dodecylsulfamate and tetracycline hexylsulfamate is rapid and complete, and higher levels are found than those of tetracycline hydrochloride in all cases.

(b) Rectal administration.—Administered to 15 rabbits each having a weight between 2.8 and 3.2 kilograms was a suppository comprising 125 mg. of product (expressed in tetracycline hydrochloride activity). Five rabbits were given a tetracycline dodecylsulfamate suppository, 5 other rabbits a suppository of tetracycline hexylsulfamate, and to the last 5 one of mepicycline.

Blood samples were taken at the end of 2 and 5 hours. The results are indicated in Table III.

TABLE III

| Product | Concentration $\mu g./cm.^3$ at the end of— | |
|---|---|---|
| | 2 hours | 7 hours |
| Tetracycline dodecylsulfamate | 4.8 | 3.1 |
| Tetracycline hexylsulfamate | 5.2 | 3.0 |
| Mepicycline | 2.2 | 1.02 |

The hematic levels obtained according to this method are clearly superior to those of mepicycline, the tolerance being very good.

(c) Intramuscular administration.—Three tests were carried out on rabbits, using 3 groups of 5 animals. Administered to them, respectively, were tetracycline dodecyl-hydrochloride in solution form containing 50 mg. of product to be tested (expressed in tetracycline hydrochloride) per cc. of solvent and per kg. of weight.

Hematic evaluations were made at the end of 2, 10, 15 and 20 hours, respectively, and the values were deduced by interpolation on a normal curve of tetracycline hydrochloride.

The experiment was repeated in intervals of 8 days, changing the groups of animals in such a manner that each group received each of the products once.

No variations in the groups used were noted, and Table IV gives the average of the results obtained.

TABLE IV

| Product | Concentrations $\mu g./cm.^3$ at the end of— | | | |
|---|---|---|---|---|
| | 2 hours | 10 hours | 15 hours | 20 hours |
| Tetracycline dodecylsulfamate | 6.3 | 5.8 | 7.2 | 2 |
| | 5.4 | 5.2 | 6.1 | 1.5 |
| | 5.1 | 6 | 5.5 | 2.1 |
| | 3.8 | 4.1 | 4.2 | 2.2 |
| Tetracycline hexylsulfamate | 5.8 | 6.1 | 8.2 | 2.3 |
| | 5.4 | 5.2 | 8.0 | 1.2 |
| | 6.8 | 7.0 | 7.9 | 2.3 |
| | 7.2 | 7.0 | 9.1 | 1.2 |
| | 4.2 | 3.8 | 3.0 | 1.6 |
| Tetracycline hydrochloride | 4.2 | 5.3 | 3.8 | (¹) |
| | 3.7 | 5.9 | 4.1 | (¹) |
| | 4.1 | 4.5 | 3.6 | (¹) |
| | 4.2 | 3.8 | 3.0 | 1.6 |
| | 3.5 | 2.8 | 3.5 | 0.5 |

¹ Not detectable.

The results which were obtained confirm that a slow and constant absorption takes place both for tetracycline dodecylsulfamate and tetracycline hexylsulfamate. The concentrations obtained are superior to those of tetracycline hydrochloride in such a manner that, in view of the excellent tolerance of the two compounds, both of them are good antibiotics with a prolonged action.

(5) Clinical tests

The products were used in 301 cases having different infectious syndromes, by the intramusclar method and orally, under the following conditions.

Tetracycline dodecylsulfamate

Intramuscular method:                      Cases
    500 mg. every 12 hours _____ 23
    250 mg. every 12 hours _____ 41
    100 mg. every 12 hours _____ 28
Oral method:
    250 mg. every 8 hours _____ 20

Tetracycline hexylsulfamate

Intramuscular method:
    500 mg. every 12 hours _____ 37
    250 mg. every 12 hours _____ 52
    100 mg. every 12 hours _____ 26
Oral method:
    250 mg. every 8 hours _____ 74

The tolerance relative to the intramuscular method is very good in all of the cases, including those with the highest doses. Adverse effects after the ingestion of the medicine orally were not observed either. Noted were a good delayed effect and a good therapeutic efficacy. The medicine proposed by the present invention may be administered orally, rectally or parenterally in doses of between 100 and 1000 mg. of active constituent every 24 hours (expressed as tetracycline hydrochloride).

For these forms of administration, the medicine is available in the form of injectable ampoules, capsules, syrups or suppositories with the appropriate excipients.

Six pharmaceutical formulas of the medicine according to the present invention will be given hereinbelow by way of non-limitative example.

(A) Tetracycline dodecylsulfamate (1) Injectable preparation "100":
                                                                 Gram
    Tetracycline dodecylsulfamate _____ 0.147
    Ethanolamide of gentisic acid _____ 0.075
(2) Injectable preparation "250":
    Tetracycline dodecylsulfamate _____ 0.368
    Ethanolamide of gentisic acid _____ 0.150
(3) Injectable preparation "500":
    Tetracycline dodecylsulfamate _____ 0.737
    Ethanolamide of gentisic acid _____ 0.500

As solvent the following are utilized:

| | Percent |
|---|---|
| Dimethylacetamide | 12.5 |
| Benzyl alcohol | 2.5 |
| Glyceryl formal | 15 |
| Lidocaine | 1 |

H₂O, quantity sufficient for 100%.

in the amount of 2.5 cc. for preparation "100" and 4 cc. for preparations "250" and "500."

(4) Capsules:
Tetracycline dodecylsulfamate _____gram__ 0.368
Mg stearate _____do____ 0.020
Excipient (amidon or lactose), sufficient quantity.

(5) Syrup:
Propylene glycol _____cc__ 20
Tetracycline dodecylsulfamate _____g__ 2.25
"Tween 20" (polyoxyethylene sorbitan
  monolaurate) _____g__ 2.0
Saccharine soluble _____g__ 0.2
Sodium cyclamate _____g__ 1.5
Vitamin C _____g__ 3.0
40% sodium bisulfite _____cc__ 0.2
70% sorbitol _____cc__ 2.5
Essence of currant _____mg__ 0.5
Water, quantity sufficient for 60 cc.

(6) Suppositories:
Tetracycline dodecylsulfamate _____g__ 0.147
Excipient ("Monoleno IM 8") _____g__ 1.400

(7) Suppositories:
Tetracycline dodecylsulfamate _____g__ 0.368
Excipient ("Monoleno IM 8") _____g__ 1.150

(8) Suppositories:
Tetracycline dodecylsulfamate _____g__ 0.737
Excipient ("Monoleno IM 8") _____g__ 1.850

(B) Tetracycline hexylsulfamate (1) Injectable preparation "100":
Tetracycline hexylsulfamate _____g__ 0.130
Sodium glycinate _____g__ 0.050
NaHSO₃ _____g__ 0.013
Ampoule—
  Lidocaine hydrochloride _____g__ 0.025
  Propylene glycol _____g__ 0.100
  "Polysorbate 80" (polyoxyethylene
    sorbitan monooleate) _____g__ 0.050
Water, quantity sufficient for 2.5 cc.

(2) Injectable preparation "250":
Tetracycline hexylsulfamate _____g__ 0.325
Sodium glycinate _____g__ 0.100
NaHSO₃ _____g__ 0.022
Ampoule—
  Lidocaine hydrochloride _____g__ 0.040
  Propylene glycol _____g__ 0.200
  "Polysorbate 80" _____g__ 0.100
Water, quantity sufficient for 4 cc.

(3) Injectable preparation "500":
Tetracycline hexylsulfamate _____g__ 0.650
Sodium glycinate _____g__ 0.200
NaHSO₃ _____g__ 0.030
Ampoule—
  Lidocaine hydrochloride _____g__ 0.050
  Propylene glycol _____g__ 0.300
  "Polysorbate 80" _____g__ 0.180
H₂O, quantity sufficient for 5 cc.

(4) Suppositories:
Tetracycline hexylsulfamate _____g__ 0.163
Massa estearinum, quantity sufficient for 1 suppository.

(5) Suppositories:
Tetracycline hexylsulfamate _____g__ 0.325
Massa estearinum, quantity sufficient for 1 suppository.

(6) Capsules:
Tetracycline hexylsulfamate _____g__ 0.325
Magnesium stearate _____g__ 0.020
Amidon _____g__ 0.080

(7) Extemporaneous syrup:
Powder—
  Tetracycline hexylsulfamate _____g__ 0.033
  Ascorbic acid _____g__ 0.005
  Sodium tartrate _____g__ 0.050
  Sodium cyclamate _____g__ 0.020
  Saccharine soluble _____g__ 0.002
  Methylcellulose _____g__ 0.010
Solution:
  Simple 50% syrup _____cc__ 0.3
  H₂O, quantity sufficient for 1 cc.

The tetracycline derivatives of the present invention may also be manufactured in the form of compressed pills, dragées, syrups in an already mixed solution or suspension, drops and other forms of local or general usage. The injectable preparations thereof may also be prepared in the form of an already mixed solution.

It is apparent from the foregoing tests that the novel compounds according to the present invention may be utilized with beneficial results in human therapy.

In the general formula given hereinabove for the compounds of the present invention, it is to be understood that T represents a tetracycline molecule or a molecule of any therapeutically administrable derivative thereof and is not limited to those specifically above. Therapeutic tetracycline molecules are known in the art, and the sulfamate derivatives thereof of the present invention are all therapeutically beneficial and have an excellent local tolerance for all methods of administration. The tetracycline moiety is attached to the $(R-NHSO_3H)_n$ moiety by a salt-like bond. The R is a linear alkyl radical of 2 to 18 carbon atoms and includes, for example, the alkyl groups ethyl, propyl, butyl, pentyl, hexyl, heptyl, octyl, nonyl, decyl, undecyl, dodecyl, tridecyl, tetradecyl, pentadecyl, hexadecyl, heptadecyl and octadecyl. And, as noted above, $n$ may be either 1 or 2. All of these derivatives show the beneficial properties illustrated by tetracycline dodecylsulfamate and tetracycline hexylsulfamate hereinabove.

The invention being thus described, it will be obvious that the same may be varied in many ways. Such variations are not to be regarded as a departure from the spirit and scope of the invention, and all such modifications as would be obvious to one skilled in the art are intended to be included herein.

We claim:
1. A compound of the formula:

$$T \cdot (R-NHSO_3H)_n$$

wherein T is selected from the group consisting of tetracycline, oxytetracycline, chlortetracycline, demethylchlortetracycline, methyleneoxytetracycline, N - (2 - hydroxyethyl) - diethylenediaminomethylenetetracycline, pyrrolidinomethylenetetracycline and tetracycline-L-methylenelysine, R is a linear alkyl group of 10 to 18 carbon atoms and $n$ is 1 or 2.

2. A compound according to claim 1, wherein $n$ is 1.
3. A compound according to claim 1, wherein $n$ is 2.
4. Tetracycline n-dodecylsulfamate.
5. A compound according to claim 1, wherein R is n-dodecyl.
6. A compound according to claim 1, wherein R is n-hexadecyl.

References Cited

UNITED STATES PATENTS 3,299,124  1/1967  Boissier et al.

ALEX MAZEL, Primary Examiner

A. M. T. TIGHE, Assistant Examiner

U.S. Cl. X.R.

260—268, 326.3, 519; 424—227